UNITED STATES PATENT OFFICE.

WILHELM MAJERT, OF GRUNAU-BERLIN, GERMANY.

PROCESS OF PURIFYING ORTHOTOLUENESULFO-CHLORID.

SPECIFICATION forming part of Letters Patent No. 603,195, dated April 26, 1898.

Application filed March 27, 1897. Serial No. 629,515. (No specimens.)

*To all whom it may concern:*

Be it known that I, WILHELM MAJERT, a subject of the King of Prussia, German Emperor, and a resident of Grunau-Berlin, in the Kingdom of Prussia, German Empire, have invented a Process for Purifying Chlorid of Orthotoluolsulfur, of which the following is a full, clear, and exact specification.

Hitherto paratoluenesulfo-chlorid $$\left( C_6H_4SO_2Cl \; {}^3_{IV} {}^{CH_3\;I} \right)$$

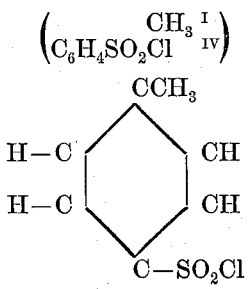

has been separated from orthotoluenesulfo-chlorid $$\left( C_6H_4SO_2Cl \; {}^3_{II} {}^{CH_3\;I} \right)$$

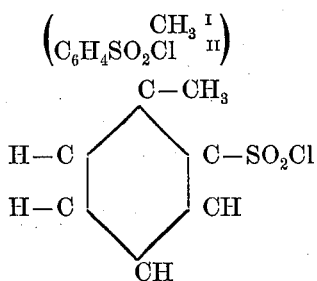

by crystallization of the former in a freezing mixture. The fluid part obtained consists of seventy per cent. orthotoluenesulfo-chlorid $\left( C_6H_4SO_2Cl \; {}^3_{II} {}^{CH_3\;I} \right)$ and thirty per cent. paratoluenesulfo-chlorid $\left( C_6H_4SO_2Cl \; {}^3_{IV} {}^{CH_3\;I} \right)$, or 70 per cent. + 30 per cent.
$$C_6H_4SO_2Cl \; {}^3_{II} {}^{CH_3\;I} + C_6H_4SO_2Cl \; {}^3_{IV} {}^{CH_3\;I}.$$

Out of this thirty per cent. orthotoluenesulfo-chlorid is distilled in a vacuum and so is obtained thirty per cent. almost pure $C_6H_4SO_2Cl \; {}^3_{II} {}^{CH_3\;I}$ plus seventy per cent. mixture, consisting of forty parts $C_6H_4SO_2 \; {}^3_{IV} {}^{CH_3\;I}$ plus thirty parts $C_6H_4SO_2Cl \; {}^3_{IV} {}^{CH_3\;I}$.

The two chlorids cannot be separated by fractional distillation in a vacuum. I have found that an almost-pure orthotoluenesulfo-chlorid can be obtained in the following manner: Of the mixture, containing about seventy per cent. of orthotoluenesulfo-chlorid and thirty per cent. paratoluenesulfo-chlorid, about thirty to forty parts, by weight, are distilled in a vacuum. The distillate consists of almost chemically-pure orthotoluene-sulfo-chlorid. The residue is cooled off and about ten to twelve parts paratoluenesulfo-chlorid crystallize out of the same. This is separated from the fluid, another part of the orthotoluenesulfo-chlorid is distilled, and so on.

If about thirty per cent. of the mixtures of ortho and para toluenesulfo-chlorid are distilled in rarefied air, the thermometer shows during the distillation the following temperatures, with a corresponding mercury height of about—

| Centimeters | 20 | 30 | 40 | 50 | 60 | 70 |
|---|---|---|---|---|---|---|
| Degrees centigrade. | 230 | 229 | 219 | 210 | 195 | 165 |

I claim—

The process of separating orthotoluene-sulfo-chlorid from a mixture of ortho and para toluenesulfo-chlorid, consisting in distilling out a quantity of orthotoluenesulfo-chlorid, cooling the residue to crystallize out paratoluenesulfo-chlorid, separating the crystals from the liquid and subjecting the latter to distillation, substantially as described.

In witness whereof I have hereunto set my hand in presence of two witnesses.

WILHELM MAJERT.

Witnesses:
HENRY HASPER,
W. HAUPT.